(12) United States Patent
Sanders

(10) Patent No.: US 7,696,305 B2
(45) Date of Patent: Apr. 13, 2010

(54) POLYSTYRENE PROCESSING APPARATUS AND METHOD

(76) Inventor: Joseph Douglas Sanders, 176 High St., Glendale, KY (US) 42740

( * ) Notice: Subject to any disclaimer, the term of this patent is extended or adjusted under 35 U.S.C. 154(b) by 686 days.

(21) Appl. No.: 11/457,764

(22) Filed: Jul. 14, 2006

(65) Prior Publication Data
US 2007/0191500 A1 Aug. 16, 2007

Related U.S. Application Data

(60) Provisional application No. 60/773,226, filed on Feb. 15, 2006.

(51) Int. Cl.
*C08F 6/00* (2006.01)

(52) U.S. Cl. ............ 528/502 E; 528/480; 528/502 R; 521/40; 165/64; 422/129; 422/131; 422/138

(58) Field of Classification Search ........... 165/158, 165/81, 163, 157, 64; 521/40, 47, 48, 48.5, 521/50, 60, 61, 142, 146, 40.5, 41; 210/634, 210/635; 427/487, 373; 524/543, 464, 577; 526/348; 264/204, 207; 528/480, 491, 497, 528/502 E, 502 R; 425/90; 422/129, 131, 422/138, 198, 292, 244, 255
See application file for complete search history.

(56) References Cited

U.S. PATENT DOCUMENTS

| | | | |
|---|---|---|---|
| 3,104,829 A | 5/1962 | Wahlin | |
| 5,824,709 A * | 10/1998 | Suka | 521/47 |
| 5,863,002 A | 1/1999 | Noguchi et al. | |
| 6,098,649 A | 8/2000 | Noguchi et al. | |
| 6,169,121 B1 | 1/2001 | Noguchi et al. | |
| 6,210,581 B1 | 4/2001 | Inagaki et al. | |
| 6,500,872 B1 * | 12/2002 | Noguchi et al. | 521/47 |
| 6,626,235 B1 * | 9/2003 | Christie | 165/158 |
| 6,720,467 B2 * | 4/2004 | Cistone et al. | 585/241 |

OTHER PUBLICATIONS

"Using Oranges for Styrofoam Recycling", website: http://www.sony.net/Products/SC-HP/cx_news/vol09/pdf/cxeye.pdf printed Apr. 4, 2008, 3 pages.

* cited by examiner

*Primary Examiner*—Ling-Siu Choi
*Assistant Examiner*—Frances Tischler
(74) *Attorney, Agent, or Firm*—Christopher Wood; Wood & Eisenberg, PLLC

(57) ABSTRACT

A method and apparatus for processing polystyrene. The method includes the steps: using at least one scrapped surface heat exchanger (160) to heat a solution of polystyrene dissolved in an organic solvent to provide a heated solution of polystyrene dissolved in the organic solvent, and separating the dissolved polystyrene from the organic solvent. The apparatus includes: a holding tank at least partly filled with a solution of polystyrene dissolved in an organic solvent, at least one scrapped surface heat exchanger (160), and a separator.

9 Claims, 3 Drawing Sheets

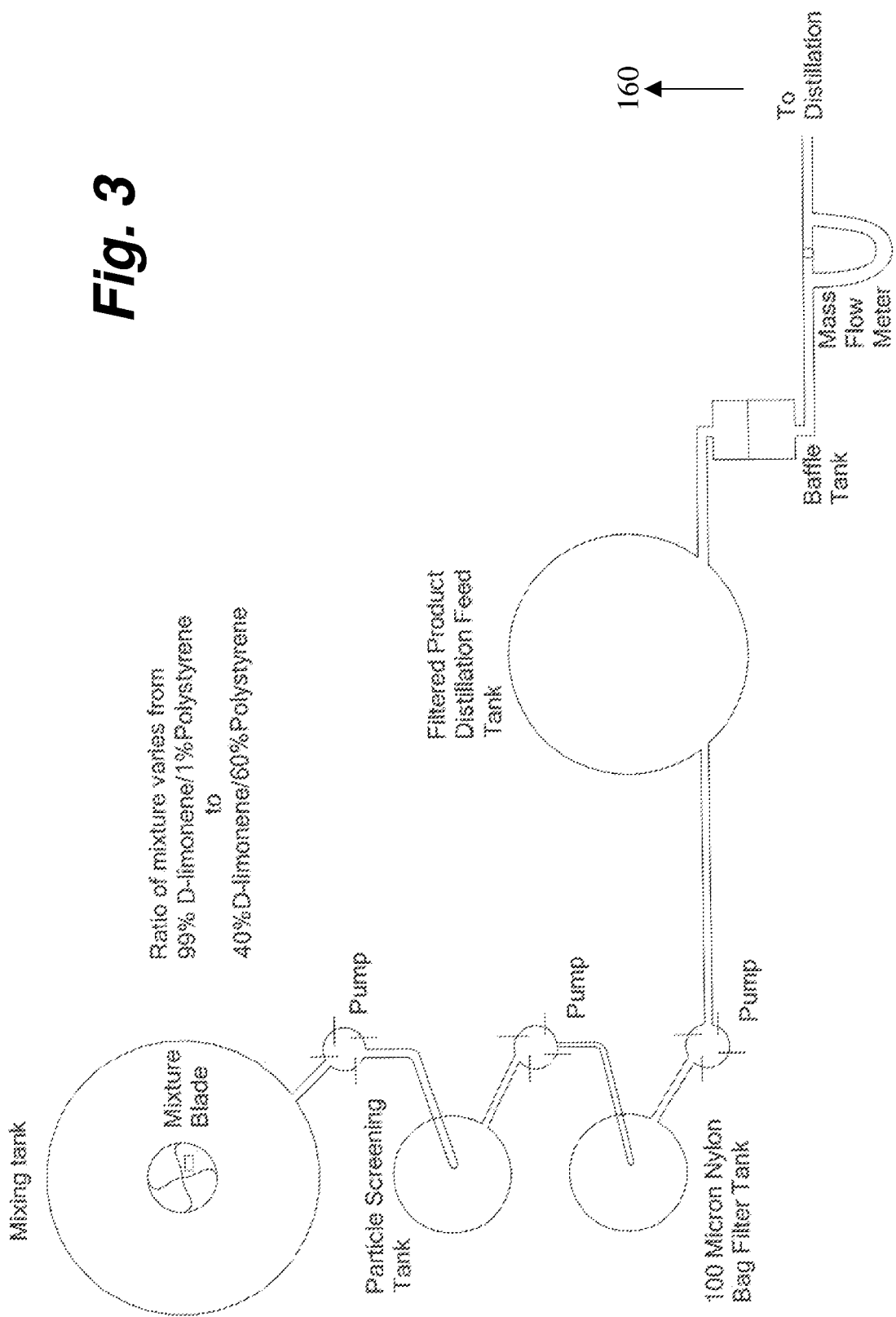

POLYSTYRENE PROCESSING APPARATUS AND METHOD

CROSS-REFERENCE TO RELATED APPLICATIONS

This application claims the benefit of priority from U.S. Provisional Patent Application Ser. No. 60/773,226, filed Feb. 15, 2006, the entire contents of which are incorporated herein by reference.

STATEMENT REGARDING FEDERALLY SPONSORED RESEARCH OR DEVELOPMENT

Not Applicable.

FIELD OF THE INVENTION

The invention is an apparatus and method for efficient processing of polystyrene (e.g., discarded expanded or foam polystyrene).

BACKGROUND OF THE INVENTION

Waste polystyrene, such as expanded polystyrene, presents particular economic and environmental problems. The density of expanded polystyrene is such that carrying waste expanded polystyrene on trucks is very wasteful. More specifically, expanded polystyrene has such a low density, and hence high relative volume per unit mass, that trucks used to transport waste expanded polystyrene often "bulk out". In other words, trucks, semi-trucks, tractor-trailers, large rigs, 18-wheeler rigs, etc., can each be filled with expanded polystyrene without any reaching their load carry capacity.

In addition, the environmental impact of waste expanded polystyrene is a serious matter. Waste expanded polystyrene takes up a disproportionate amount of space at landfill sites. Recycling expanded polystyrene is economically wasteful in light of the "top out" problem.

There are several issued U.S. Patents devoted to dealing with the economic and environmental issues surrounding the burying or recycling of waste expanded polystyrene, such as U.S. Pat. No. 6,169,121, issued Jan. 2, 2001 to Noguchi et al. The '121 patent describes a processing method for effectively and promptly removing insoluble components contained in a solution of a styrene resin waste material to enable regeneration of high-quality regenerated styrene. A solution of the styrene resin waste material in an organic solvent is processed with, for example, a dehydrating agent, to remove insoluble components. The resulting clarified solution is degasified on heating in vacuum to remove the organic solvent for recycling the resulting mass as a regenerated styrene resin.

U.S. Pat. No. 6,098,649, issued Aug. 8, 2000 to Aug. 8, 2000, describes a waste recovery system using this apparatus and a liquid container ideal for use with the waste processing apparatus and waste recovery system. The waste processing apparatus comprises a processing part for processing supplied waste (for example foam polystyrene) with a processing liquid (for example limonene) and a storing part for storing produced liquid (for example limonene containing dissolved foam polystyrene) produced in this processing part and provided with a removable liquid container constructed to both supply processing liquid to the processing part and receive produced liquid produced by the waste processing apparatus. In the waste recovery system, the liquid container is removed from the waste processing apparatus after receiving the produced liquid and carried to a waste recycling apparatus, the produced liquid is transferred from the liquid container into the waste recycling apparatus, waste or waste and processing liquid is recovered from the produced liquid by the waste recycling apparatus and the empty liquid container is filled with new or recycled processing liquid and returned to the waste processing apparatus again.

None of the above inventions and patents taken either singly or in combination is seen to describe the instant invention as claimed.

SUMMARY OF THE INVENTION

A method and apparatus for processing polystyrene. The method includes the steps: using at least one scrapped surface heat exchanger (160) to heat a solution of polystyrene dissolved in an organic solvent to provide a heated solution of polystyrene dissolved in the organic solvent, and separating the dissolved polystyrene from the organic solvent. The apparatus includes: a holding tank at least partly filled with a solution of polystyrene dissolved in an organic solvent, at least one scrapped surface heat exchanger (160), and a separator.

BRIEF DESCRIPTION OF THE DRAWINGS

FIG. 3 is a schematic of plant designed to mix polystyrene and solvent according to the invention.

Similar reference characters denote corresponding features consistently throughout the attached drawings.

DETAILED DESCRIPTION OF THE INVENTION

The invention is directed to an apparatus and method for efficient processing of polystyrene (e.g., expanded or foam polystyrene). The apparatus of the present invention is denoted generally by the numeric label 100.

Figure 1:
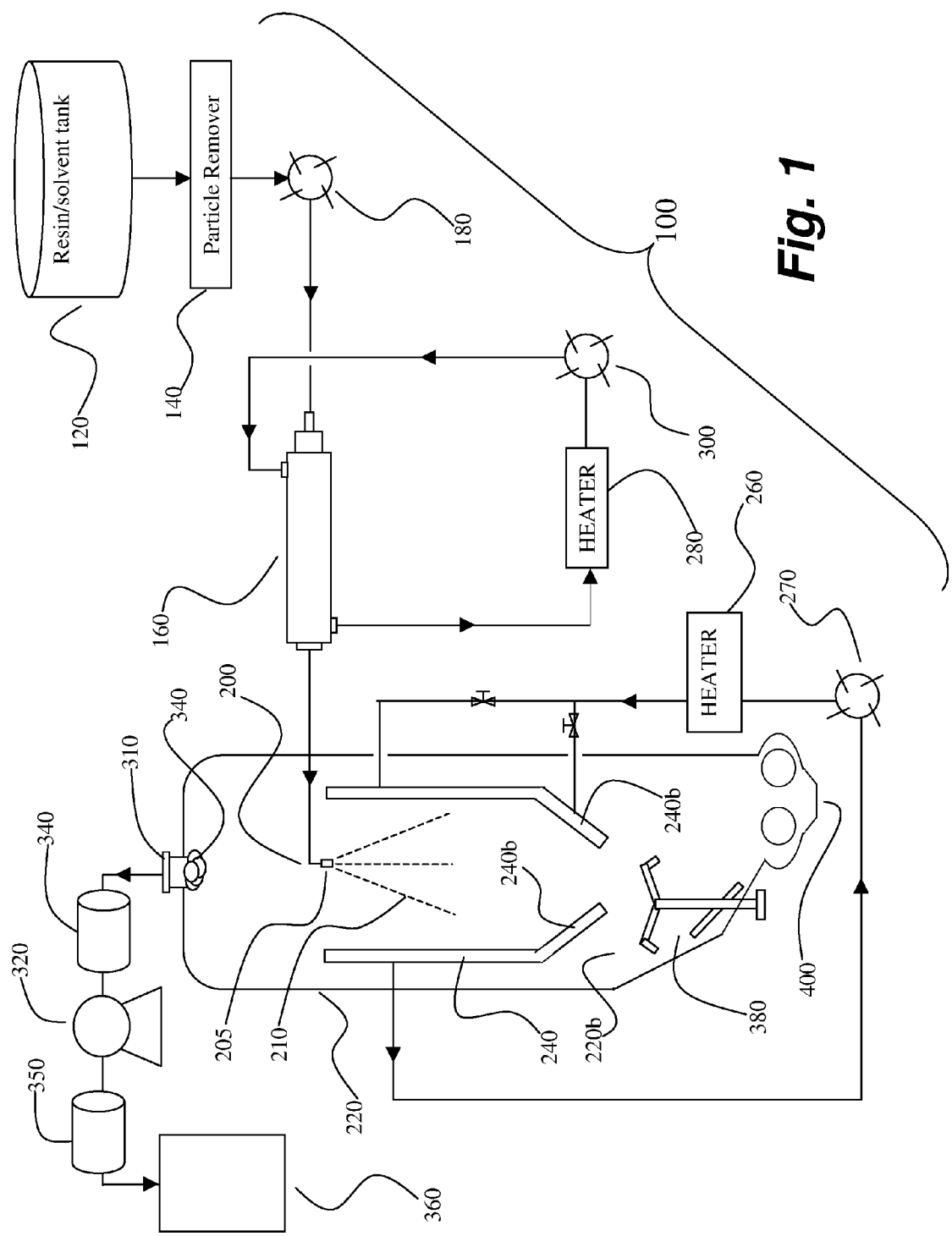
FIG. 1 is a processing flow diagram of a polystyrene processing apparatus 100 according to an embodiment of the present invention.

FIG. 1 is a processing flow diagram of a polystyrene processing apparatus 100 according to an embodiment of the present invention. Polystyrene, such as expanded polystyrene, dissolved in solvent is held in resin/solvent tank 120 from which it is directed through a particle remover 140 to remove solids to provide a substantially solid free solution of polystyrene and solvent. The substantially solid free solution of polystyrene and solvent is thence directed to at least one scrapped surface heat exchanger 160 by operation of a pump 180. The scrapped surface heat exchanger 160 heats up the substantially solid free solution of polystyrene, which is then directed to sprayer 200. The sprayer 200 is located inside a chamber 220. The chamber 220 includes a heating jacket 240. At least one heater 260 is used to provide heated liquid or steam to heating jacket 240 under the operation of at least one pump 270.

The amount of heat delivered to the bottom 240b of the heating jacket 240 should be adjusted to prevent the separated polystyrene polymer from becoming too viscous for efficient plant operation in the bottom part 220b of chamber 220. For example, the Applicant has noted that a temperature of about 370° F. maintained in the bottom part 240b of the heating jacket 240 might be sufficient, but it will be understood by a person or ordinary skill in the art that the temperature of the bottom 240b of heating jacket 240 (and, therefore 220b) may vary according to the particular set-up and configuration of the chamber 220 and a person of ordinary skill in the art could establish by routine operation of the plant what temperature should be applied to the bottom 240b of the heating jacket 240. Likewise, the temperature of in the vicinity of the at least one spray nozzle 205 can be adjusted to ensure that the solution (polystyrene/solvent) is atomized to a sufficient degree to allow for efficient separation of the polymer from the solvent through evaporation of droplets 210. A filter, such as glass wool filter 305, can be located at the top of chamber 220 near an output port 310 to prevent strands of styrene carrying over from the styrene-polymer/solvent into the heat exchanger 340.

More generally, the chamber 220 is used to separate the dissolved polystyrene from the solvent. A vacuum pump 320 is used to lower the pressure inside chamber 220. The vacuum pump 320 can be a liquid ring vacuum pump to allow the solvent to be moved while maintaining a vacuum. The sprayer 200 generates droplets 210 of polystyrene dissolved in solvent, which are directed downward. The solvent evaporates from the droplets 210 and is drawn upwards by operation of vacuum pump 320. The solvent is then cooled by heat exchanger 340, then by heat exchanger 350 (with the vacuum pump 320 located between heat exchangers 340 and 350). Solvent is collected in a solvent recovery tank 360.

The chamber 220 is under a vacuum during operation. The vacuum pressure and nozzle pressure can vary and still provide satisfactory operation. More particularly, the vacuum pressure in chamber 220 and nozzle 205 pressure may vary depending based on such factors as heat in the chamber 220 (residual or maintained), GPM or nozzle volume throughput, pressure of produce and laminar flow at nozzles 205, vacuum separation inherent of atomization based on Newton fall. During optimum operation a vacuum of 18" Hg (eighteen inches Mercury pressure) in chamber 220 should be sufficient to maintain satisfactory operation, but the vacuum pressure in chamber 220 can vary between about 10" Hg and about 29" Hg vacuum pressure. Nozzle 205 pressure of about 77 PSI (77 pounds pressure per square inch) should provide satisfactory operation, but the nozzle pressure can vary between about 12 PSI and about 85 PSI.

Recovered solvent held in tank 360 can be reused to dissolve unprocessed polystyrene. As the droplets 210 lose solvent, the previously dissolved polystyrene now exists in the form of dense polystyrene polymer. The polymer is optionally agitated by an agitation section 380 prior to exiting at 400. A sufficient amount of heat is delivered to the heating jacket 240 to maintain a temperature of about 370° F. at the bottom of the chamber 220 to prevent the separated styrene polymer from becoming too viscous and difficult to handle. The separated styrene polymer can be converted into pellets by a pelletizer (not shown) as described in U.S. Pat. No. 6,169,121, issued Jan. 2, 2001 to Noguchi et al.

It should be understood that members, such as member 160 (i.e., scrapped surface heat exchanger 160), might comprise a single unit (i.e., one scrapped surface heat exchanger 160) or operate in parallel to increase or meet throughput requirements. Thus, it will be understood by a person of ordinary skill in the art that the process and apparatus shown in FIG. 1 can vary in number, rated throughput or rearranged (e.g., in units operating in parallel) and still remain within the scope of the claimed invention.

Still referring to FIG. 1, a heater 280 is used to provide heat transfer medium to the scrapped surface heat exchanger 160 under the operation of pump 300. The heat transfer medium can take any suitable form such as liquid or gas (e.g., steam). It will be understood by persons of ordinary skill in the art that the various elements shown in FIG. 1 can be arranged differently without detracting from the spirit of the invention. For example, heaters 260 and 280 can be replaced with a single heater without detracting from the spirit of the invention.

Suitable scrapped surface heat exchangers are available from Waukesha Cherry-Burrell of 611 Sugar Creek Road, Delavan, Wis. 53115, USA (TEL: 1-800-252-5200, FAX: 1-800-252-5012). The scrapped surface heat exchanger 160 can be, for example, a "Votator® extra heavy duty scrapped surface heat exchanger, which is rated to heat products with high viscosities of about $10^6$ centipoises. The scrapped surface heat exchanger 160 can have a concentric, eccentric or oval heat transfer tube. An eccentric design will work particularly well as it is rated as suitable for heating viscous and sticky products. Likewise, the oval design will work particularly well as it is rated to process extremely viscous products.

The Applicant has devoted a considerable amount of effort into solving the problem of separating polystyrene polymer from resin-solvent solution by means of vacuum spray drying. The resin-solvent solution is extremely viscous and difficult to heat uniformly in a heat exchanger. Polystyrene-solvent ratios of 30/70 (i.e., 30% polystyrene resin concentration) present serious problems in terms of throughput and uniform heating. The resin tends to stick to heat transfer surfaces thereby deleteriously impacting on heat transfer. Resin-solvent ratios of 30/70 are difficult to heat up using, for example, steam heated tube or multiple tube heat exchangers. The resin sticks to the interior surfaces of the tubes thus creating a low heat conducting barrier and thence causing lower throughput due to compromised heat transfer. Resin-solvent ratios of 30/70 will gum up the sprayer 200 if the resin-solvent is not sufficiently heated. Heating reduces viscosity such that under temperature 30/70 ratio will have too high a viscosity thereby causing gumming up of sprayer 200. After a considerable amount of effort, the Applicant evolved a solution by proposing spray drying of polystyrene resin/solvent by employing a scrapped surface heat exchanger upstream of the sprayer 200 and a heating jacket 240 in combination with vacuum pump 320 as shown in FIG. 1.

Instead of using spray drying under vacuum to separate the solvent from the dissolved polystyrene as taught in the present invention, the prior art teaches applying boiling to separate the solvent from the polystyrene. For example, U.S. Pat. No. 6,169,121 teaches clarifying the solution of polystyrene and solvent by a separator (8) into polystyrene and the solvent. This separator (8) is heated by the thermal medium of a boiler (9) to approximately 240° C. Boiling at such a high temperature is at least partly necessary because the rate of separation of the solvent from the polystyrene is a function of surface area through which the solvent can escape from the polystyrene. In the present invention, the Applicant makes use of a scrapped surface heat exchanger 160 in combination with sprayer 200 and vacuum pump 320, wherein the scrapped surface heat exchanger 160 enables rapid uniform heating of the polystyrene/solvent liquid and the sprayer 200 produces droplets with surface area favorable for more rapid conversion of the solvent into gas and hence speaks to a more rapid separation of polystyrene from the solvent leading to increased throughput of polystyrene/solvent. The absolute amount of heat energy transferred from the scrapped surface heat exchanger 160 to the polystyrene/solvent mix is less than the energy required to boil the solvent off as required in the prior art '121 patent.

The scrapped surface heat exchanger 160 enables even and more rapid heating of the polystyrene/solvent mix and less likelihood of blockages in one or more spray nozzles 205. The scrapped surface heat exchanger 160 is a significant improvement over a tube and shell heat exchanger. In addition, the scrapped surface heat exchanger 160 will allow greater % concentrations of dissolved polystyrene to be processed than possible with standard tube and shell heat exchangers. The combination of scrapped surface heat exchanger 160 and sprayer 200 has never been used before and offers a significant improvement in processing polystyrene waste for disposal or for recycling to produce new polystyrene products.

It should be understood that the solvent (i.e., processing liquid for dissolving polystyrene such as expanded polystyrene dissolved in a solution of solvent such as d-limonene at, for example, about 30% concentration, i.e., a 30/70 polystyrene/solvent solution, respectively) is not limited to one particular solvent, though limonene and more specifically d-limonene is particularly suited to as a solvent for dissolving expanded polystyrene to provide a polystyrene/solvent solution. The solvent can be at least one solvent chosen from a group consisting of an aromatic organic solvent, a hydrocarbon organic solvent, an ether organic solvent, an ester organic solvent, a ketone organic solvent and a monoterpene organic solvent. Also, the solvent can be at least one solvent chosen from the group consisting of limonene, isoamyl acetate, benzyl propionate and ethyl butyrate. In addition, the solvent can be at least one solvent chosen from the group consisting of d-limonene, isoamyl acetate, benzyl propionate and ethyl butyrate. The solvent can be d-limonene.

The temperature range of operation for the scrapped surface heat exchanger is typically chosen to deliver the solution (i.e., polymer/solvent) at the sprayer 200 in the range between about 235° F. and about 255° F. A person of ordinary skill in the art would monitor the temperature of the solution entering the sprayer and adjust the heater 280 to ensure the temperature of the solution leaving the scrapped surface heat exchanger 160 is high enough to ensure that the temperature of the fluid entering the sprayer 200 is in the range between about 235° F. and 255° F. It is preferred that the solution is not heated above about 385° F. Expanded polystyrene is sometimes pre-treated with a bromine-based fire retardant, which can cause problems if the solution is heated much above about 385° F.

The sprayer 200 should be capable of atomizing the solution to ensure rapid evaporation of the solvent and hence separation of the polystyrene from the solvent. The sprayer 200 makes use of at least one nozzle 205. Any suitable nozzle can be used so long as the nozzle atomizes the solution, i.e., produces a stream of droplets 210 sufficiently small to allow rapid evaporation of the solvent. The at least one nozzle 205 can produce, for example, a hollow coned spray, a full coned spray or a flat spray. The at least one nozzle 205 can be at least one nozzle chosen from a group consisting of a hollow coned spray nozzle, a full coned spray nozzle, a flat spray nozzle, a twister nozzle. An example of a twister nozzle is the YS series twister nozzle supplied by BEX Incorporated (located at various sites including: 37709 Schoolcraft Road, Livonia, Mich., 48150-1009 USA). BEX Inc. also provides a wide selection of hollow coned, full coned and flat spray nozzles.

Spraying Systems Company also provide a range of spraying system nozzles such as, but not limited to, a full jet, ⅜", 316SS with a 22 drill (Part # 3/8HH-316SS22). Spraying Systems Company can be contacted at: PO Box 7900, Wheaton Ill. 60189-7900, Phone 630-665-5000. A suitable nozzle type is described in U.S. Pat. No. 3,104,829 issued Sep. 24, 1963 to Wahlin. In addition, Spray Systems Company provides a new range of stainless steel IceJet™ inlet cooling and evaporation nozzles. The IceJet™ inlet cooling and evaporation nozzle utilizes a whirl chamber to produce a fine mist of droplets.

Figure 2:
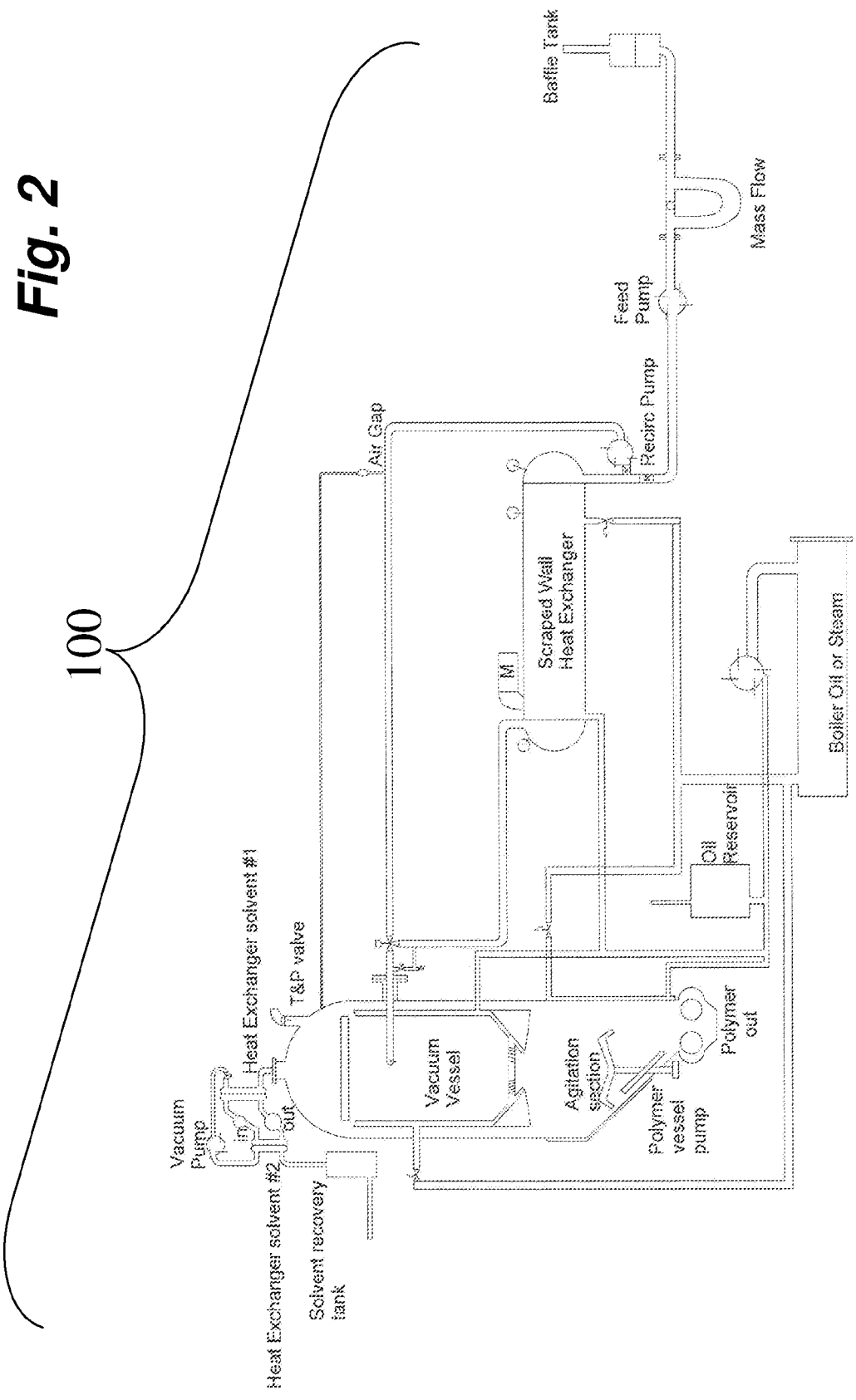
FIG. 2 shows a further process layout according to the invention.

FIG. 2 shows a further process layout according to the invention.

FIG. 3 shows how polystyrene and a solvent such as d-limonene might be mixed and filtered upstream of the scrapped surface heat exchanger, wherein example ranges of polystyrene concentration (as volume %) with respect to d-limonene are provided. Specifically, the example range is 1/99 (where the d-limonene solvent contains 1 volume % polystyrene) to 60/40 (where d-limonene solvent contains 60 volume % polystyrene). It will be understood that the exact way of mixing can vary without detracting from the spirit of the claimed invention.

In one non-limiting example (referred to here as "Example #1"), the bottom 240*b* of the heating jacket 240 is configured to function, at least partly, as a porous heated plate. In this example, the heating jacket 240 is a basic round vessel that is approximately ½ inch thick (variable based on throughput) and has oil circulating in between 2-10 gauge plates at the bottom end 240*b*, which is also angled inwards and has, for example, multiple ½ inch openings with oil caused to flow around them. The angle is in relation so that molten polystyrene will flow through into the bottom of the vessel without allowing the mist (originating from droplets 210) to go straight through. The intent of this heated and angled bottom part 240*b* with holes is to allow the polystyrene to flatten and thereby increase surface area then flow into the bottom 220*b* of vessel 220. The temperature at the bottom 240*b* can be in the range 350° F. to 375° F. The upper part of the chamber 220 is maintained at about 390° F.

Still referring to Example #1, the solution (of polystyrene/solvent) enters #22 nozzle at 60-80 psi in (larger than needed 3.4 GPM @1800 cP) but there is a possibility of a stringing effect (due to the larger orifice) up to 165° F. in a 70/30 (solvent/polystyrene) ratio and stringing or sporadic effect up to 180° F. due to possible laminar flow and centipoises value of the mass. Hence a spiral incorporated into the at least one nozzle 205 to control momentum diffusion at a specific point and keeping the product temp around 235° F. at the least one spray nozzle 205 (if d-limonene solvent is used, 235° F. is about 15° F. degrees above boiling point of the solvent). Some atomizing effect might be lost because of substance consistency but the height of the vessel and substance velocity should be large enough that any un-flashed solvent will loosen from entrainment through the product/chamber vessel 220 temperature being high enough to create vapor pressure greater than the polymer entrainment ability. Also the Newton force is pulling on the mass (polystyrene) not on the vapor (unless entrained), hence the use of the porous heated section 240*b* (any entrained vapor will be released upon impact with 240*b*). Only 5% of vapors recovered should be released at blast plate 240*b* level. It should be understood that the terms "blast base plate 240*b*" and "bottom 240*b* of the heating jacket 240" are regarded in this embodiment as equivalent terms.

It is to be understood that the present invention is not limited to the embodiments described above, but encompasses any and all embodiments within the scope of the following claims.

I claim:

1. A method for processing polystyrene comprising:
   using at least one scrapped surface heat exchanger to heat a solution of polystyrene dissolved in an organic solvent to provide a heated solution of polystyrene dissolved in the organic solvent;
   directing said heated solution to a sprayer, wherein said heated solution is between about 235° F. and about 255° F. upon arrival at said sprayer;

spraying said heated solution into a chamber to create a stream of droplets of solvent with dissolved polystyrene dissolved in said droplets, wherein the pressure inside said chamber is between about 10 inches Mercury pressure and about 29 inches Mercury pressure, wherein said sprayer comprises at least one spray nozzle, and said heated solution is sprayed from said at least one spray nozzle at between about 12 pounds pressure per square inch and about 85 pounds pressure per square inch, and separating the dissolved polystyrene from the organic solvent through a combination of evaporation of said droplets and impacting said droplets against a porous plate.

2. The method according to claim 1, wherein the heated solution is sprayed at a nozzle pressure of about 77 pounds per square inch.

3. The method according to claim 1, wherein the pressure inside said chamber is set at 18 inches Mercury pressure.

4. The method according to claim 1, wherein the solvent is selected from the group consisting of an aromatic organic solvent, a hydrocarbon organic solvent, an ether organic solvent, an ester organic solvent, a ketone organic solvent and a monoterpene organic solvent.

5. The method according to claim 1, wherein the solvent is selected from the group consisting of limonene, isoamyl acetate, benzyl propionate and ethyl butyrate.

6. The method according to claim 1, wherein the solvent is d-limonene.

7. The method according to claim 1, wherein said solution of polystyrene dissolved in an organic solvent is provided by mixing d-limonene and expanded polystyrene in a mixing tank followed by particle screening.

8. The method according to claim 1, wherein spraying said heated solution is performed using at least one nozzle chosen from a group consisting of: a hollow coned spray nozzle, a full coned spray nozzle, a flat spray nozzle, and a twister nozzle.

9. The method according to claim 1, wherein the temperature at the bottom of said chamber is maintained in the range 350° F. to 375° F.

* * * * *